April 25, 1939.  L. E. LA BRIE  2,156,120
MASTER CYLINDER UNIT FOR BRAKES
Filed Sept. 12, 1935  2 Sheets-Sheet 1
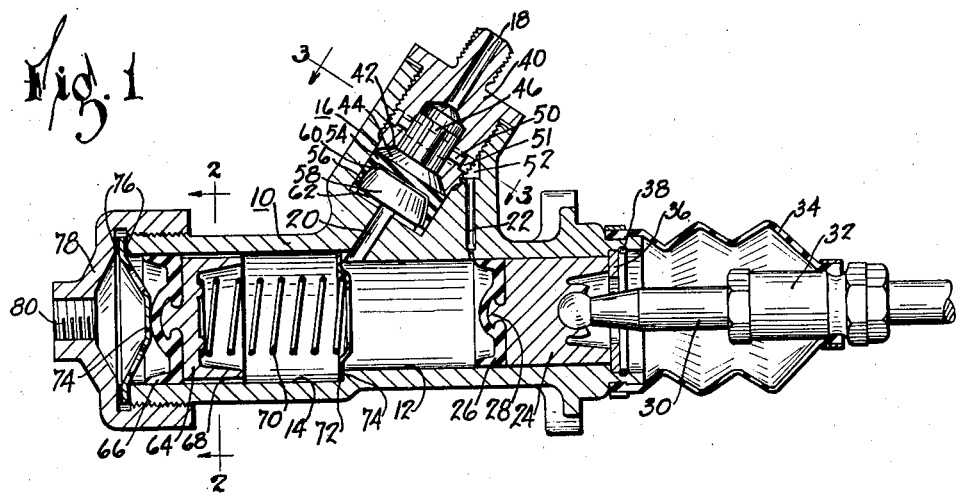
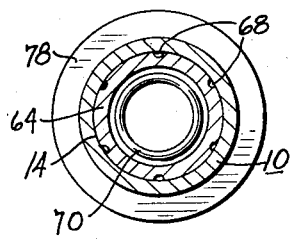
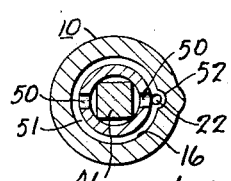
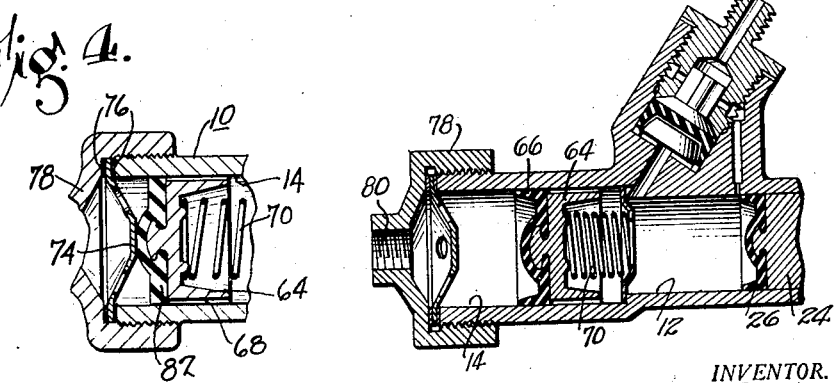
INVENTOR.
LUDGER E. LaBRIE
BY
ATTORNEY April 25, 1939.  L. E. LA BRIE  2,156,120
MASTER CYLINDER UNIT FOR BRAKES
Filed Sept. 12, 1935  2 Sheets-Sheet 2
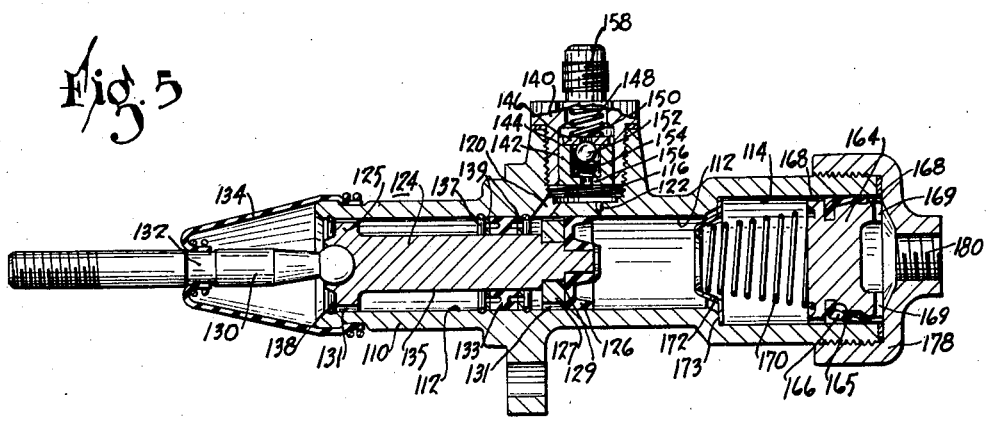
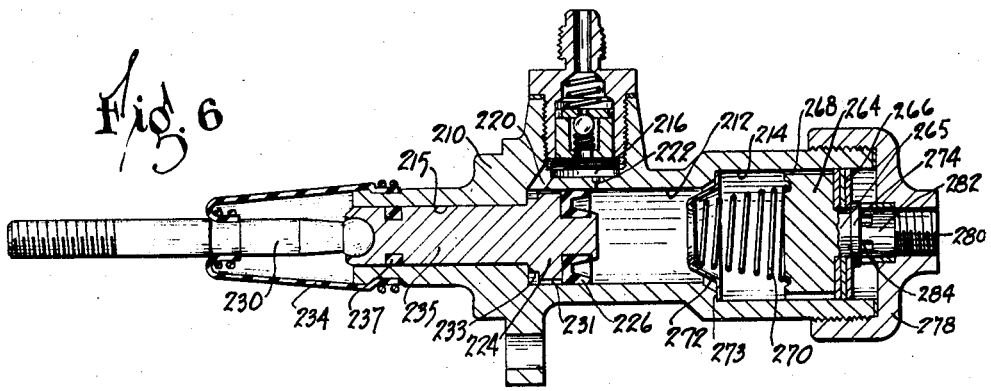
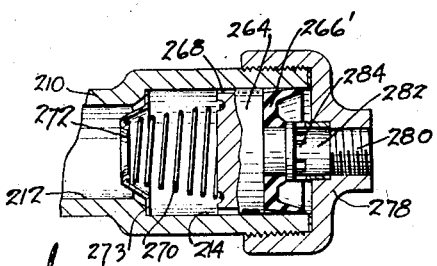
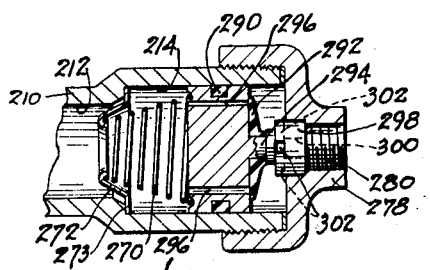
INVENTOR.
LUDGER E. LABRIE
BY
ATTORNEY.

Patented Apr. 25, 1939

2,156,120

UNITED STATES PATENT OFFICE 2,156,120

MASTER CYLINDER UNIT FOR BRAKES

Ludger E. La Brie, South Bend, Ind., assignor to Bendix Products Corporation, South Bend, Ind., a corporation of Indiana Application September 12, 1935, Serial No. 40,289

7 Claims. (Cl. 60—54.6)

This invention relates to hydraulic control systems, and particularly to master cylinders adapted for use therein.

The invention has to do with a novel form of master cylinder especially adapted for hydraulic braking systems of automotive vehicles, the master cylinder having provision therein for maintaining pressure conditions within the brake system at all times and particularly during return stroke movement of the master cylinder so that at no time will there be any tendency for air to leak into the system, it being well understood in the art that the presence of air or other elastic gases in the line detracts from the maximum possible mechanical advantage of such a system.

An object of the invention, therefore, is to provide in a master cylinder means for preventing the master piston on its return stroke from producing sub-atmospheric pressures in the pipe lines leading to the motor cylinders.

Another object of the invention is to provide a hydraulic brake master cylinder so constructed that any sub-atmospheric pressure conditions which may exist as a result of return stroke movement can only exist within the master cylinder structure.

A further object of the invention is to provide an extremely simple form of master cylinder which may have the hereinbefore mentioned qualities.

The above and other objects and novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings, wherein like reference numerals indicate like parts;

Fig. 1 is a longitudinal section through one form of master cylinder embodying the invention;

Fig. 2 is a cross section taken on line 2—2 of Fig. 1;

Fig. 3 is a cross section taken on line 3—3 of Fig. 1;

Fig. 4 is a fragmentary longitudinal section of a modified form of the discharge end of the master cylinder of Fig. 1;

Fig. 5 is a longitudinal section through another form of master cylinder embodying the invention;

Fig. 6 is a longitudinal section through a form of the invention slightly modified from Fig. 5;

Fig. 7 is a fragmentary longitudinal section showing a slightly modified discharge end of the master cylinders of Figs. 5 and 6;

Fig. 8 is another fragmentary longitudinal section showing a slightly modified discharge end of the master cylinders of Figs. 5 and 6, and Figure 9 is a view similar to Figure 1 showing the device filled with liquid and showing the position of the floating piston after the brakes have been applied several times.

Referring to the drawings and more particularly Fig. 1, there is shown a master cylinder casing 10, having an operating piston bore 12 and a coaxial but larger discharge piston bore 14. The casing is also provided with a cylindrical valve chamber 16 located on the top side thereof, the latter having a connection 18 adapted to lead to a supply reservoir and a coaxial port 20 and a compensating port 22, both leading into the operating piston cylinder bore, the latter just forward of the return position of the piston 24 and its cup washer 26, and the former near the extreme forward end of the operating cylinder bore 12. The cup washer may be secured to the forward piston face by stretching over a knob 28 integral with the piston 24. The piston may be actuated by a rod 30 having an adjustatble collar 32, provided with one end of a flexible boot 34 secured at its other end to the outside wall of the cylinder casing. To limit return stroke movement of the piston an annular disc 36 with a lock ring 38 is set in an annular groove in the back of the cylinder, and the collar 32 may be suitably adjusted on the piston rod so as to engage the disc 36 and limit the forward stroke movement of the piston.

The cylindrical valve chamber 16 is provided with a hollow threaded plug 40 having an annular conical face 42 on its inner end, and a conical valve 44 seated thereon with a fluted stem 46 extending upwardly into the hollow plug. The reservoir connection bore 18 is arranged coaxially in the plug, and the hollow portion 48 of the plug is provided with a plurality of radial bores 50 leading to an annular groove 51 adapted to register with a recess 52 in the cylindrical valve chamber connected with the compensating port 22.

To doubly assure against leakage past the conical valve, a cup washer 54 may be positioned on its forward face, the lip flange 56 of which is adapted to engage the portion of the cylindrical wall of the valve chamber. To limit the opening and closing movement of the valve, a bumper 58 having a shape similar to the interior of the cup washer 54 but slightly smaller by a fixed clearance 60 is arranged centrally in the bottom of the valve chamber. Free flow of liquid to the master cylinder bore through port 20 is provided for past the bumper by the radial grooves 62 milled in the base thereof.

The discharge end of the cylinder having the enlarged bore 14 is provided with a floating piston 64 having a cup washer 66 on its forward face, and grooves 68 spaced around its periphery. A relatively light spring 70 is compressed between the back face of the piston and an annular recessed washer 72 seated on a shoulder 74 formed by the difference in diameter of the cylinder bores 14 and 12. Forward movement of the piston 64 is arrested by engagement with a cupped and ported disc 74 adapted to engage the piston, and clamped between thin annular washers 76 held in place between the end of the cylinder and a screw cap 78, the latter having a discharge outlet port 80. In Fig. 4 the piston 64 is illustrated with a flat thick washer 82 in place of the cup washer 66 of Fig. 1.

When the brake is first applied, the floating piston may be in the position shown in Figure 1. Therefore movement of the piston 24 forward forces fluid past the floating piston 64 to apply the brakes. When the pedal is released, the pressure of the springs at the wheel cylinder acting through the liquid and on the floating piston 64 forces that piston back compressing the spring 70 until the floating piston assumes the position shown in Figure 9. The spring 70 thus exerts a slight positive pressure on the fluid in the system.

The fluid which is trapped ahead of the floating piston does not go back to the reservoir when the brake is released. The fluid merely compresses the spring 70 and moves the piston 66 rearwardly to release the brake. On account of the fact that the piston 66 has a larger area than the piston 24, the piston 66 does not move rearwardly as far as the piston 24. In other words, in normal brake application, the piston 24 is moved forward and forces fluid forward. The fluid being forced forward and acting on the rearward face of the piston 66, moves that piston forward. The forward face of the piston 66 acts on the fluid in front thereof to create pressure which is transmitted to the brakes as the piston 66 moves forward. On account of the difference in areas in these pistons, the piston 24 moves forward more than the piston 66. Consequently, when brake pedal pressure is released, the piston 66 does not move rearwardly as far as the piston 24. By this arrangement, in which the fluid does not normally have to bypass around the piston 66 on the brake application, in normal applications it does not have to overcome any spring on the valve, and the pedal pressure is substantially all transformed into energy for applying the brakes, none of it being absorbed in overcoming a spring.

In the modification of Fig. 5, the cylinder casing 110 is provided with an operating piston bore 112 and floating piston bore 114 and a valve chamber 116. The operating piston 124 is of the spool type having an integral guide flange 125 at the rear, and a forward flange 127 arranged on a reduced shouldered portion 129 behind an annular cup washer 126. Each of the flanges have elemental grooves 131 arranged around their peripheries. A double faced annular cup washer 133 arranged around the reduced central portion 135 of the piston is preferably held in place in the piston bore 112 between lock rings 137 and perforated annular metal discs 139. Forward and rearward movement of the piston is limited by the rear flange 125 engaging the rear lock ring 137, and a lock ring 138 arranged in a groove in the end of cylinder bore. The piston is actuated by a piston rod 130 having an annular groove 132 adapted to receive one end of a flexible boot 134, the other end of which is stretched over the cylinder end.

The valve chamber 116 of cylindrical bore is provided with a compensating port 122 leading into the operating piston bore 112 just forward of the return stroke position of the piston and cup washer 126, and a port 120 leading from the chamber to a point in the cylinder bore just behind the forward piston flange 127. A hollow plug 140 threaded into the valve chamber carries a double check valve offering a measured resistance to flow in either direction. The hollow plug is provided with a sleeve 142 rigidly secured therein, the sleeve carrying on its upper face 144 a valve washer 146 normally seated thereon by a spring 148 located thereabove and compressed against the upper end of the hollow plug. The washer 146 has a central port 150 adapted to coact with a ball valve 152 located therebelow and urged upward into engagement with the port 150 by a spring 154 compressed between the ball and an internally inwardly-extending flange 156 on the lower end of the sleeve 142. The plug 140 is provided at its top with a nipple 158 adapted to be connected to any suitable reservoir.

The enlarged discharge end of the cylinder of Fig. 5 is provided with a piston 164 having an L section annular groove 165 around its periphery for the reception of an annular cup washer 166. The periphery of the piston on either side of the washer is provided with a plurality of elemental grooves 168 to permit free flow of liquid past the piston in a discharge direction. The forward face of the piston is also provided with radial grooves 169 interconnecting with the elemental grooves so that flow around the piston to the discharge port 180 is afforded even when the piston is in its most forward position against the end cap 178. A light spring 170 is arranged in engagement with the back of the piston, the same being compressed therebetween and an annular cupped disc 172 seated against a shoulder 173 formed by the change in bore diameters 112 and 114.

In Fig. 6, a modified form of the invention is illustrated employing a different operating piston construction, and a slightly modified discharge piston construction. As illustrated, the cylinder casing 210 is provided with an operating piston bore 212 and discharge piston bore 214, and a reduced bore 215 adjacent the operating piston bore. The operating piston comprises a piston head 224 having an annular cup washer 226 on the forward face thereof, and a piston rod or shank 235 extending rearwardly through the reduced bore 215. The piston head is provided with elemental grooves 231 arranged around its periphery and a short shoulder 233 adapted to engage the shoulder formed by the different bore diameters 212 and 215 to limit rearward or return stroke. The shank 235 is provided with a ring washer 237 and an operating rod 230 which carries a flexible boot 234 attached to the rod and the cylinder casing.

The check valve chamber 216 is provided as in Fig. 5 with a check valve offering resistance to flow in either direction and has a filling port 220 and a compensating port 222 entering the cylinder bore 212 just behind and forward of the return position of the piston respectively.

The discharge end of the cylinder is provided with a piston 264 urged forwardly in the cylinder by a spring 270 bearing against an annular cupped disc 272 resting on a shoulder 273 formed by the different diameters of bores 212 and 214. The piston has elemental grooves 268 around its periphery, and a flexible laminated washer 266 secured to its front face on a knob 265 having a front shoulder 274. The end cap 278, having a discharge port 280, is provided with a central sleeve 282 having a castellated inner edge 284 providing a forward bumper for piston 264, but permitting free flow of fluid out the discharge port.

In Fig. 7 there is shown the piston of Fig. 6 with an annular cup washer 266' in place of the laminated washer 266.

In Fig. 8, the piston is provided with a ring washer 290, and a face washer 292 carried on a knob 294, the face washer acting as a flap valve and covering longitudinal ports 296 extending paraxially through the piston. A collar 298 having a central bore 300 and radial slots or grooves 302 forms a forward bumper and permits free flow of liquid through the discharge port 280.

Operation of the various forms of master cylinder will appear obvious from the foregoing. Normally the cylinder bores and check valve chambers are filled with hydraulic liquid. Upon a compression stroke, the operating piston and its washer pass the compensating port, thereafter forcing fluid out the discharge end and past the discharge piston. Upon the return stroke fluid is drawn into the cylinder through the check valve in Fig. 1 or through the check valve and past the operating piston head and its washers in Figs. 5 and 6. Upon or while reaching its return stroke position, the motor cylinders, not shown, force the liquid therein back through the discharge port and into the master cylinder bore by forcing the discharge piston rearwardly, the light spring behind the discharge piston permitting such action. At the same time the fluid drawn into the cylinder by the return stroke of the operating piston from the reservoir is returned either through the compensating port of Fig. 1 or through the check valve of Figs. 5 and 6, the spring 148 of the latter being light enough to permit unseating of the valve in response to the pressure developed by the return stroke action of the motor cylinders. The apparatus thereby maintains pressure conditions in the line regardless of the manner in which the master operating piston may be manually operated, thereby preventing the occurrence of sub-atmospheric conditions in any part of the line except the master cylinder in which latter structure the presence of sub-atmospheric pressures is not dangerous due to its direct connection with the reservoir and its tendency to naturally expel gases which might accumulate therein into the reservoir.

It will thus appear that there is provided an improved master cylinder construction capable of guarding against disadvantages and defects heretofore known, and although several modifications or embodiments of the invention have been illustrated and described, it is to be understood that the invention is not limited thereto but may be embodied in other mechanical arrangements and equivalent forms, or features of one modification may be substituted for those of another. As many such changes may be made without departing from the spirit of the invention, as will be apparent to those skilled in the art, reference will be had to the appended claims for a definition of the invention.

What is claimed is:

1. A hydraulic brake master cylinder comprising a casing having a double diameter bore, an operating piston reciprocable in the smaller bore, a floating piston in the larger bore, a spring compressed between said floating piston and a shoulder formed by the double diameter bore, and a washer on said floating piston permitting flow therepast in one direction only.

2. A hydraulic brake master cylinder comprising a casing having a double diameter bore and a check valve chamber, an operating piston reciprocable in the smaller bore, a floating piston in the larger bore, a spring compressed between said floating piston and a shoulder formed by the double diameter bore, a washer on said floating piston permitting flow therepast in one direction only, and ports leading from the smaller bore to said check valve chamber.

3. A hydraulic brake master cylinder comprising a casing having a double diameter bore and a check valve chamber, an operating piston reciprocable in the smaller bore, a floating piston in the larger bore, a spring compressed between said floating piston and a shoulder formed by the double diameter bore, a washer on said floating piston permitting flow therepast in one direction only, ports leading from the smaller bore to said check valve chamber, and a check valve in said chamber between said ports.

4. A hydraulic brake master cylinder comprising a casing having a double diameter bore and a check valve chamber, an operating piston reciprocable in the smaller bore, a floating piston in the larger bore, a spring compressed between said floating piston and a shoulder formed by the double diameter bore, a washer on said floating piston permitting flow therepast in one direction only, ports leading from the smaller bore to said check valve chamber, and a check valve in said chamber operating to lightly restrict flow therethrough in either direction.

5. A hydraulic brake master cylinder comprising a casing having a double diameter bore and a check valve chamber, an operating piston reciprocable in the smaller bore, a floating piston in the larger bore, a spring compressed between said floating piston and a shoulder formed by the double diameter bore, a washer on said floating piston permitting flow therepast in one direction only, ports leading from the smaller bore to said check valve chamber, and a check valve in said chamber operating to lightly restrict flow therethrough in both directions.

6. A hydraulic brake master cylinder comprising a casing having a double diameter bore, an operating piston reciprocable in the smaller bore, a floating piston in the larger bore, a spring compressed between said floating piston and a shoulder formed by the double diameter bore, a washer on said floating piston permitting flow therepast in one direction only, a port leading from the smaller bore to said check valve chamber, and a check valve in said chamber adapted to close upon pressure flow through said port.

7. A hydraulic brake master cylinder comprising a casing having a double diameter bore, an operating piston reciprocable in the smaller bore, a floating piston in the larger bore, a spring compressed between said floating piston and a shoulder formed by the double diameter bore, a washer on said floating piston permitting flow therepast in one direction only, a port leading from the smaller bore to said check valve chamber, a check valve in said chamber adapted to close upon pressure flow through said port, and a compensating port leading from the other side of said check valve to said smaller bore at a point immediately in front of the return position of said operating piston.

LUDGER E. LA BRIE.